(12) United States Patent
Lim et al.

(10) Patent No.: US 12,567,634 B2
(45) Date of Patent: Mar. 3, 2026

(54) VEHICLE BATTERY SYSTEM

(71) Applicants: HYUNDAI MOTOR COMPANY, Seoul (KR); KIA CORPORATION, Seoul (KR)

(72) Inventors: Jun Young Lim, Incheon (KR); Seon Il Yoon, Yeoju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 878 days.

(21) Appl. No.: 17/879,412

(22) Filed: Aug. 2, 2022

(65) Prior Publication Data

US 2023/0178835 A1 Jun. 8, 2023

(30) Foreign Application Priority Data

Dec. 8, 2021 (KR) ........................ 10-2021-0174921

(51) Int. Cl.
| | |
|---|---|
| *H01M 50/249* | (2021.01) |
| *B60K 15/063* | (2006.01) |
| *B60L 50/64* | (2019.01) |
| *B60R 16/023* | (2006.01) |
| *H01M 8/04082* | (2016.01) |
| *H01M 10/0525* | (2010.01) |
| *H01M 16/00* | (2006.01) |
| *H01M 50/204* | (2021.01) |
| *H01M 50/242* | (2021.01) |
| *H01M 50/262* | (2021.01) |

(Continued)

(52) U.S. Cl.
CPC ......... *H01M 50/249* (2021.01); *B60K 15/063* (2013.01); *B60L 50/64* (2019.02); *B60R 16/023* (2013.01); *H01M 8/04201* (2013.01); *H01M 10/0525* (2013.01); *H01M 16/006* (2013.01); *H01M 50/204* (2021.01); *H01M 50/242* (2021.01); *H01M 50/262* (2021.01); *H01M 50/296* (2021.01); *H01M 50/298* (2021.01); *B60K 2015/03315* (2013.01); *B60L 50/75* (2019.02); *H01M 2220/20* (2013.01); *H01M 2250/20* (2013.01)

(58) Field of Classification Search
None
See application file for complete search history.

(56) References Cited

U.S. PATENT DOCUMENTS

| | | |
|---|---|---|
| 8,372,534 B2 | 2/2013 | Carignan et al. |
| 2012/0058381 A1 | 3/2012 | Carignan et al. |

(Continued)

FOREIGN PATENT DOCUMENTS

| | | |
|---|---|---|
| KR | 20130112876 A | 10/2013 |
| KR | 20230086854 A | 6/2023 |

(Continued)

*Primary Examiner* — Wyatt P McConnell
(74) *Attorney, Agent, or Firm* — Lempia Summerfield Katz LLC

(57) ABSTRACT

A battery system of a vehicle includes: a housing which is provided between both side members of a vehicle body and arranged in a front portion or a rear portion of the vehicle; and forms an inner space; a battery and a relay provided in the inner space of the housing; and a power connector and a communication connector electrically connected to the battery and the relay and provided in a front surface portion or a rear surface portion of side surfaces of the housing.

10 Claims, 5 Drawing Sheets

(51) Int. Cl.
*H01M 50/296* (2021.01)
*H01M 50/298* (2021.01)
*B60K 15/03* (2006.01)
*B60L 50/75* (2019.01)

(56) References Cited

U.S. PATENT DOCUMENTS

| | | | |
|---|---|---|---|
| 2018/0069425 A1* | 3/2018 | Mastrandrea | H01M 10/486 |
| 2020/0331536 A1* | 10/2020 | Sloan | B60L 50/66 |
| 2023/0178835 A1 | 6/2023 | Lim et al. | |
| 2023/0202281 A1 | 6/2023 | Lim et al. | |
| 2023/0202313 A1 | 6/2023 | Lim et al. | |

FOREIGN PATENT DOCUMENTS

| | | | |
|---|---|---|---|
| KR | 20230098432 A | 7/2023 | |
| KR | 20230100288 A | 7/2023 | |

* cited by examiner

270          B          C          C

VEHICLE BATTERY SYSTEM

CROSS REFERENCE TO RELATED APPLICATION

This application claims priority to and the benefit of Korean Patent Application No. 10-2021-0174921, filed Dec. 8, 2021, the entire contents of which are incorporated herein by reference.

BACKGROUND

Field

The present disclosure relates to a battery system of a vehicle to avoid damage to a high-voltage battery and to prevent short-circuit, thereby reducing a safety risk such as fire, explosion, etc.

Description of the Related Art

Recently, in line with the global trend of reducing carbon dioxide emission, a demand for electric vehicles is significantly growing in place of a typical internal combustion engine vehicle that generates driving power through combustion of fossil fuels. The electric vehicles generate driving power by a motor with electrical energy supplied from an energy storage device such as a battery.

In addition, fuel cell vehicles such as hydrogen electric vehicles driven by an electric motor using hydrogen supplied to a fuel cell are being actively studied. More specifically, the hydrogen electric vehicles use, as power sources, electricity generated through electrochemical reaction between hydrogen and oxygen. The hydrogen electric vehicles include a hydrogen tank such that hydrogen may be adjusted to a pressure suitable for use in a hydrogen charging station and delivered to the hydrogen tank.

Conventionally, a vehicle including a high-voltage battery mounted outside is not integrated with a low-voltage battery, in which a low-voltage battery connector does not need to be separately provided. Moreover, by forming a structure in which the high-voltage battery is arranged standalone, collision shock caused in a front collision situation of a vehicle is absorbed in a vehicle body and the high-voltage battery is arranged at a position to which the collision shock is not delivered, such that there is no need to consider arrangement of a power connector for the front collision of the vehicle.

Recently, as the hydrogen tank of the hydrogen electric vehicle is arranged in the rear of the vehicle, a vehicle controller including an integrated direct current (DC) converter (IDC), etc., and a high-voltage battery supplying power of the hydrogen electric vehicle are inevitably arranged in the front of the vehicle. We have found that the high-voltage connector connected with the high-voltage battery and the signal connector, which are inevitably located in the front of the vehicle, cause arrangement and layout problems of the connector in a front or side collision situation of the vehicle.

The statements in this section are merely for improving the understanding of the background of the present disclosure, and should not be accepted as acknowledging that they correspond to the prior art known to those of ordinary skill in the art.

SUMMARY

The present disclosure provides a battery system of a vehicle in which a hydrogen tank of a fuel cell vehicle, a high-voltage battery connector based on arrangement of a high-voltage battery, a signal connector, and a low-voltage battery connector are arranged to avoid damage to the high-voltage battery and to prevent short-circuit, thereby reducing a safety risk such as fire, explosion, etc.

In one embodiment of the present disclosure, a battery system of a vehicle includes a housing provided between both side members of a vehicle body and arranged in a front portion or a rear portion of the vehicle. The housing includes a top surface, a bottom surface, and side surfaces, which form together an inner space. The battery system further includes: a battery and a relay provided in the inner space of the housing; and a power connector and a communication connector electrically connected to the battery and the relay and provided in a front surface portion or a rear surface portion of the side surfaces of the housing.

The battery may include a high-voltage battery and a low-voltage battery, and the high-voltage battery may be arranged in a front of the low-voltage battery in the inner space of the housing.

The power connector may include a high-voltage power connector and a low-voltage power connector, and the communication connector may be arranged in a front of the low-voltage power connector at a point separated from the high-voltage power connector.

A low-voltage line may be provided along an outer circumference of the housing, and the low-voltage line may be connected to a controller through the low-voltage power connector.

The high-voltage power connector and the low-voltage power connector may be arranged in a front-rear direction of the vehicle so as to be respectively provided in positions adjacent to the high-voltage battery and the low-voltage battery in the front surface portion or the rear surface portion of the housing.

The battery system may further include a controller provided adjacent to the housing outside the front surface portion or the rear surface portion of the housing.

In the housing, the power connector and the communication connector are provided at separated points to avoid overlapping the controller in the front surface portion and the rear surface portion of the housing.

The controller may be provided in a center of the front surface portion of the housing, and the communication connector may be provided in a point adjacent to the controller in the front surface portion of the housing.

The battery system may further include a low-voltage wire connecting the low-voltage battery with the relay.

In one embodiment, the low-voltage wire is arranged inside of the battery for connection.

The battery system may further include a hydrogen tank arranged in the rear portion of the vehicle and provided between the both side members of the vehicle body.

In another embodiment, the hydrogen tank is provided in the rear portion of the housing.

The low-voltage power connector may be provided between the hydrogen tank and the housing.

The battery may be a lithium-ion battery.

A side surface protection portion made of a shockproof material may be formed on the both side members of the vehicle body.

A fixing hole extending in an outward direction may be formed on the top surface of the housing, and the housing may be fixed to the vehicle body through the fixing hole.

With a battery system of a vehicle according to the present disclosure, a hydrogen tank of a fuel cell vehicle, a high-voltage battery connector based on arrangement of a high-voltage battery, a signal connector, and a low-voltage battery connector may be arranged to avoid damage to the high-voltage battery and to prevent short-circuit, thereby reducing a safety risk such as fire, explosion, etc.

In addition, effects obtainable in the present disclosure are not limited to the effects as described above, and other effects not described above should become apparent to those of ordinary skill in the art from the following detailed description.

BRIEF DESCRIPTION OF THE DRAWINGS

In order that the disclosure may be well understood, there will now be described various forms thereof, given by way of example, reference being made to the accompanying drawings, in which.

Figure 1:
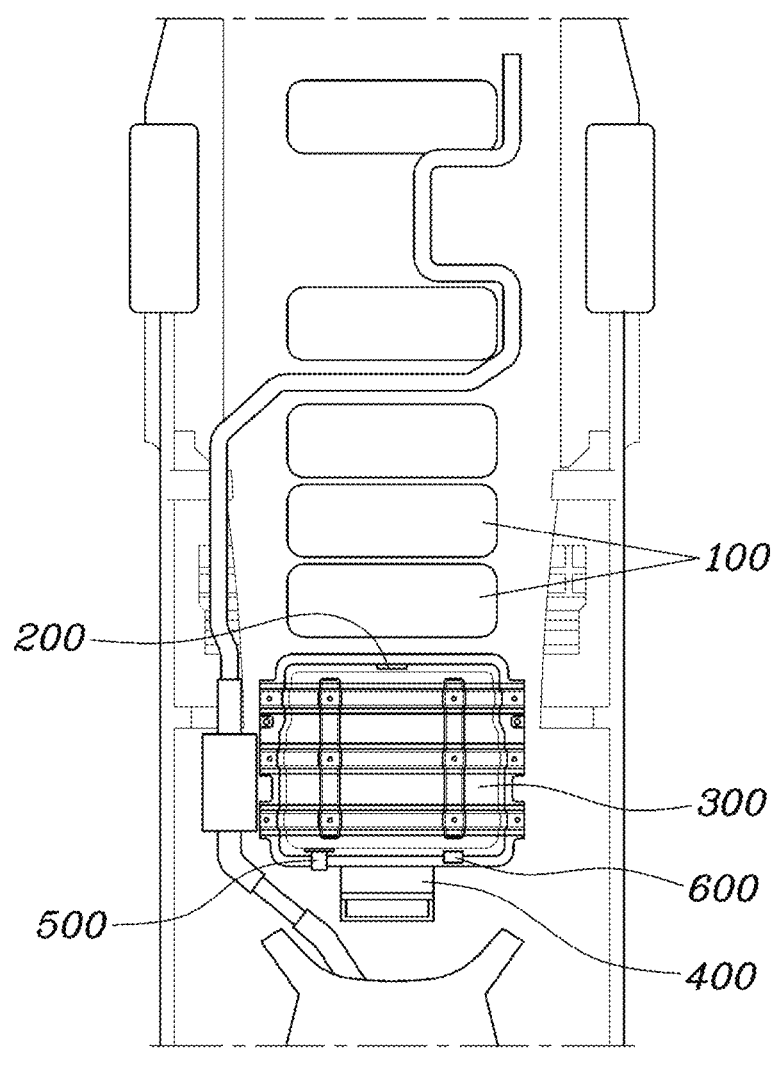
FIG. 1 illustrates a battery system of a vehicle, viewed from top, according to an embodiment of the present disclosure.

The drawings described herein are for illustration purposes only and are not intended to limit the scope of the present disclosure in any way.

DETAILED DESCRIPTION

For embodiments of the present disclosure disclosed in the present specification or application, specific structural or functional descriptions are only exemplified for the purpose of describing the embodiments of the present disclosure, and the embodiments of the present disclosure may be implemented in various forms, and should not be construed as being limited to the embodiments described in the present specification or application.

Since an embodiment according to the present disclosure may have various changes and may have various forms, specific embodiments are illustrated in the drawings and described in detail in the present specification or application. However, such a description is not construed as limiting an embodiment according to the concept of the present disclosure to a specified disclosure, and should be understood as including all changes, equivalents, or substitutes included in the spirit and technical scope of the present disclosure.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology and should not be interpreted as having ideal or exaggerated meanings unless they are clearly defined in the present specification.

When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to the accompanying drawings. Like reference numerals indicated in the drawings refer to like members.

Figure 2:
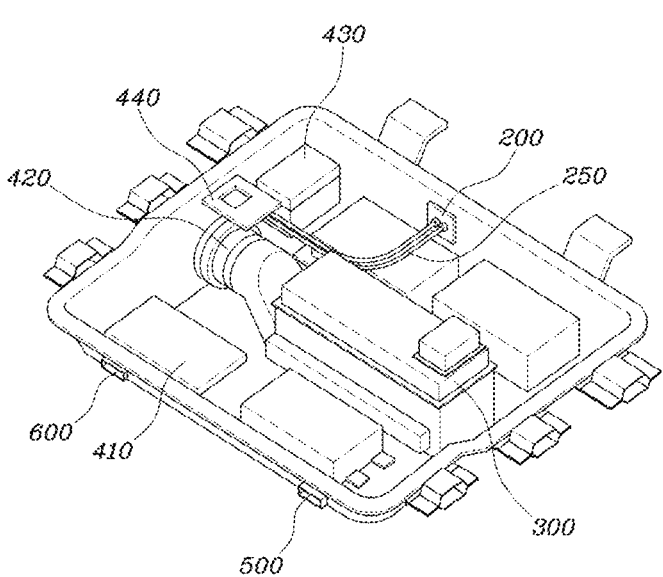
FIG. 2 illustrates arrangement of a battery and a connector constituting a housing, according to an embodiment of the present disclosure.
Figure 3:
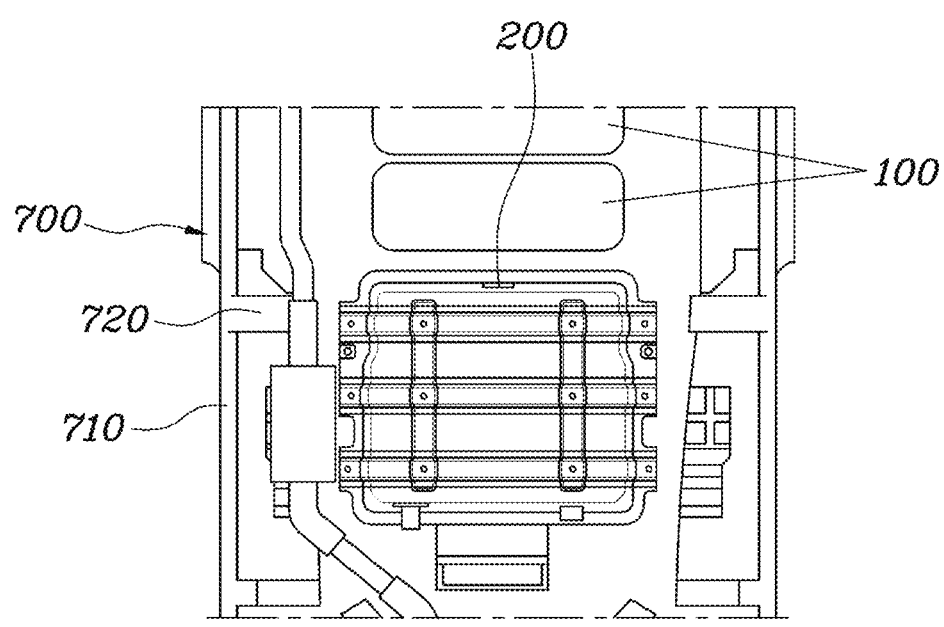
FIG. 3 illustrates arrangement of a housing, a hydrogen tank, and a side surface protection portion formed in a side member of a vehicle, according to an embodiment of the present disclosure.
Figure 4:
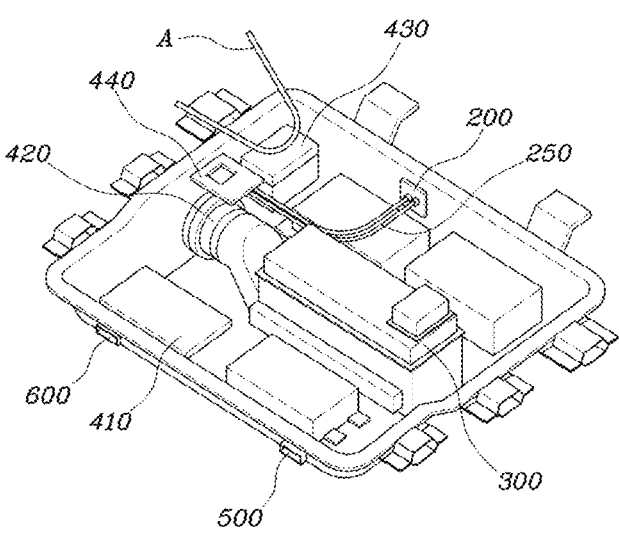
FIG. 4 illustrates that a low-voltage wire connecting a low-voltage battery and a relay is arranged inside of a battery according to an embodiment of the present disclosure.
Figure 5:
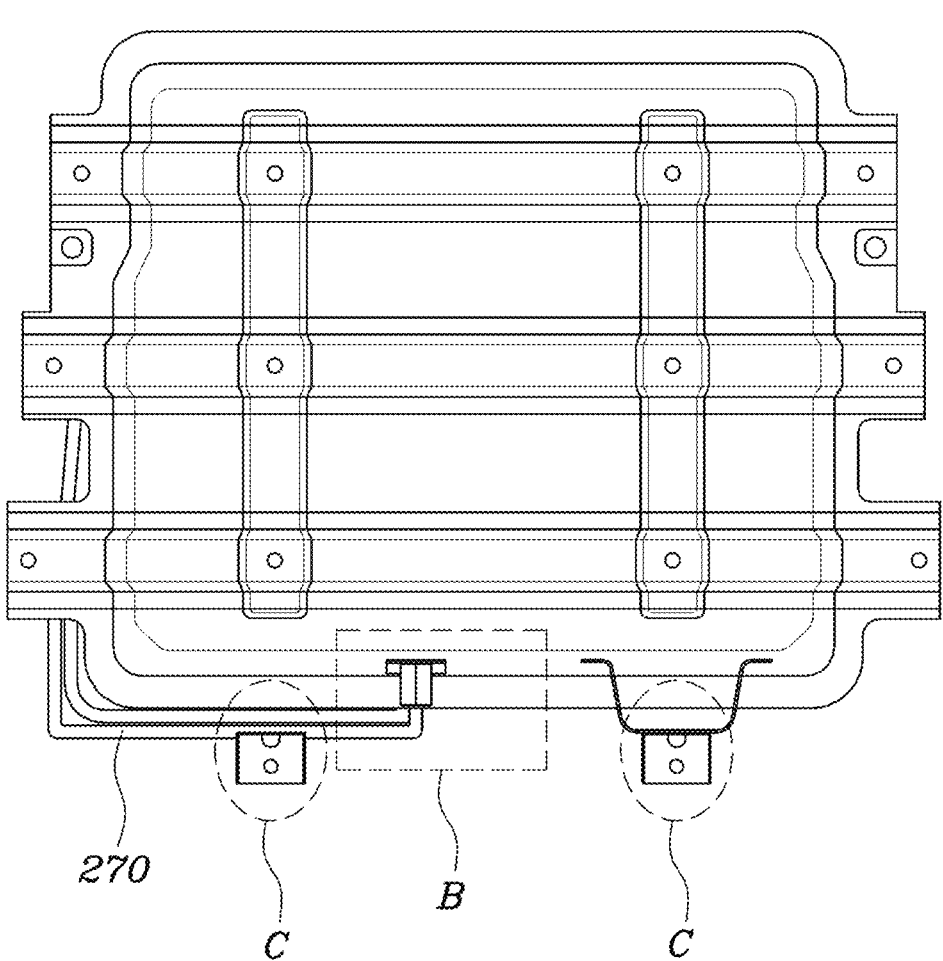
FIG. 5 illustrates arrangement of a fixing hole, a low-voltage power connector, and a low-voltage line, according to an embodiment of the present disclosure.

FIG. 1 illustrates a battery system of a vehicle, viewed from top, according to an embodiment of the present disclosure. FIG. 2 illustrates arrangement of a battery and a connector constituting a housing, according to an embodiment of the present disclosure. FIG. 3 illustrates arrangement of a housing, a hydrogen tank, and a side surface protection portion formed in a side member of a vehicle, according to an embodiment of the present disclosure. FIG. 4 illustrates that a low-voltage wire connecting a low-voltage battery and a relay is arranged inside of a battery according to an embodiment of the present disclosure. FIG. 5 illustrates arrangement of a fixing hole, a low-voltage power connector, and a low-voltage line, according to an embodiment of the present disclosure.

FIG. 1 illustrates the battery system of a vehicle, viewed from top, according to an embodiment of the present disclosure.

Referring to FIG. 1, the battery system of the vehicle may include a housing 300 provided between both side members 710 of a vehicle body. The housing 300 is arranged in a front portion or a rear portion of the vehicle, and includes a top surface, a bottom surface, and side surfaces, which form together an inner space. The battery system further includes: a battery and a relay 430 provided in the inner space of the housing 300; and a power connector and a communication connector 600 electrically connected to the battery and the relay 430 and provided in a front surface portion or a rear surface portion of the side surfaces of the housing 300.

In one embodiment of the present disclosure, the hydrogen tank 100 of a fuel cell vehicle, a high-voltage battery connector based on arrangement of a high-voltage battery, a signal connector, and a low-voltage battery connector may be arranged to avoid damage to the high-voltage battery and to prevent short-circuit, thereby reducing a safety risk such as fire, explosion, etc.

Recently, among mass-produced vans, hydrogen electric vehicles driven with an electric motor by using hydrogen supplied to a fuel cell have already been developed and have used a base vehicle body applied to mass production. The hydrogen tank 100 is arranged in the rear of the vehicle, and a vehicle controller 400 including an integrated direct current (DC) converter (IDC), etc., and the high-voltage battery supplying power of the hydrogen electrical vehicle are arranged in the front of the vehicle.

As the hydrogen tank 100 of the hydrogen electric vehicle is arranged in the rear of the vehicle, the vehicle controller 400 including the IDC, etc., and a high-voltage battery supplying power of the hydrogen electric vehicle are inevitably arranged in the front of the vehicle. Because the high-voltage connector connected to the high-voltage battery, and the signal connector are inevitably arranged in the front of the vehicle, the high-voltage connector and the signal connector are shocked in a front or side collision situation of the vehicle. Moreover, when the power connector and the communication connector 600 are arranged in the center of the front surface of the vehicle, it is difficult to configure a vehicle wiring path sometimes.

As a result, short-circuit may occur upon occurrence of a shock on the connector, causing a safety risk such as fire, explosion, etc., such that arrangement or layout manners of connectors that connect the high-voltage battery, the low-voltage battery, and the controller 400 to protect the high-voltage battery, the low-voltage battery, and the controller 400 may become issues.

More specifically, the housing 300 may be provided between the both side members 710 of the vehicle body, and arranged in the front portion or rear portion of the vehicle. The housing 300 may include the top surface, the bottom surface, and the side surfaces, and thus form the inner space. In the housing 300, the battery, the relay 430, a module duct 420, a blower 440, and a BMS (Battery management system) 410 may be provided, and the power connector and the communication connector 600 connected to the outside may be provided on an outer wall of the housing 300. In one embodiment, the housing 300 may be arranged in the center between the side members 710 of the vehicle body to protect the battery, etc. In another embodiment, if the hydrogen tank 100 is arranged in the rear portion of the vehicle, the housing 300 may be arranged in the front portion. In other embodiment, if the hydrogen tank 100 is arranged in the front portion of the vehicle, the housing 300 may be arranged in the rear portion.

In addition, the power connector and the communication connector 600 connected to the battery may be electrically connected to the battery and the relay 430, and may be provided in the front surface portion or the rear surface portion of the side surfaces of the housing 300. The relay 430 may connect or block power of a DC high-voltage battery to drive an inverter of the electric vehicle, and the power connector and the communication connector 600 connected to the battery and the relay 430 may connect the inner space of the housing 300 to an outer space of the housing 300.

The battery may include a high-voltage battery and a low-voltage battery, and the high-voltage battery may be arranged in the front of the low-voltage battery in the inner space of the housing 300.

The vehicle may include a high-voltage battery for directly providing power to an electric motor to drive the vehicle, and a low-voltage battery for supplying power to an electrical/electronic system of the vehicle. The low-voltage battery generally uses a voltage of 12V, and the high-voltage battery and the low-voltage battery may use lithium-ion batteries having strengths in electric vehicles, such as high voltage, high-energy density, low self-discharge rate, etc. The lithium-ion battery is weak to temperature and shock, such that battery arrangement is important inside the housing 300. The high-voltage battery and the low-voltage battery may be located respectively adjacent to corresponding power connectors, and the high-voltage battery may be arranged in the center to be connected to the module duct 420, on a side surface in the inner space of the housing 300 to cause induction of the air.

The relay 430, the BMS 410, and the low-voltage battery except for the module duct 420 and the high-voltage battery may be arranged in the rear of the housing 300 based on a position of internal wiring. The low-voltage battery may be arranged in the rear of the high-voltage battery in the inner space of the housing 300 to supply power to the electrical/electronic system of the vehicle. The blower 440 may be provided in the housing 300 to communicate the inner space of the battery with the outside of the battery, and ventilate the inner space of the housing 300 through the blower 440.

FIG. 2 illustrates arrangement of a battery and a connector constituting the housing 300, according to an embodiment of the present disclosure.

The power connector may include a high-voltage power connector 500 and a low-voltage power connector 200. In one embodiment, the communication connector 600 may be arranged in the front of the low-voltage power connector 200 at a point separated from the high-voltage power connector 500. The power connector may include the high-voltage power connector 500 connected to the high-voltage battery and the low-voltage power connector 200 connected to the low-voltage battery. The communication connector 600 may be connected to the controller 400. The high-voltage power connector 500 and the low-voltage power connector 200 may be respectively arranged adjacent to the high-voltage battery and the low-volage battery connected thereto, and the communication connector 600 may be arranged adjacent to the controller 400.

More specifically, the controller 400 may be provided adjacent to the housing 300 outside the front surface portion or the rear surface portion of the housing 300, and the power connector and the communication connector 600 may be provided at separated points in the front surface portion or the rear surface portion of the housing 300 to avoid overlapping the controller 400. The controller 400 may be used as the same meaning as the controller 400 including the IDC and a V2L (Vehicle to load), and may be connected to the communication connector 600 provided in the front surface portion or the rear surface portion of the side surfaces of the housing 300. The power connector may include the high-voltage power connector 500 and the low-voltage power connector 200, and when the controller 400 is provided in the front surface portion of the housing 300, the controller 400 may be between the high-voltage power connector 500 and the communication connector 600 to separate them. By separating the high-voltage power connector 500 from the communication connector 600, fire, explosion, etc., may be prevented from occurring due to front or side collision of the vehicle.

The controller 400 may be provided in the center of the front surface portion of the housing 300, and the communication connector 600 may be provided adjacent to the controller 400 in the front surface portion of the housing 300. The controller 400 including the IDC and the V2L may perform overall control of the vehicle, such as an integrated direct current conversion function in the center of the vehicle or use of electric power of the electric vehicle in the outside, etc. Therefore, by arranging the controller 400 in the center of the vehicle, the BMS 410 may integrally manage the high-voltage battery and the low-voltage battery of the vehicle through the communication connector 600.

FIG. 5 illustrates arrangement of a fixing hole C, the low-voltage power connector 200, and a low-voltage line 270, according to an embodiment of the present disclosure.

Referring to FIG. 5, the low-voltage line 270 may be provided along an outer circumference of the housing 300, and the low-voltage line 270 may be connected to the controller 400 through the low-voltage power connector 200. At this time, the fixing hole C extending in the outward direction may be formed on the top surface of the housing 300, the housing 300 may be fixed to the vehicle body through the fixing hole C, and the low-voltage power connector 200 may be located in a position of a low-voltage connector space B and may be fixed to a vehicle frame through the fixing hole C where a flange extends in a bolt engagement structure. In this case, considering the fixing hole C formed in the flange and the layout of the low-voltage line 270, the low-voltage power connector 200 may be positioned.

FIG. 4 illustrates that a low-voltage wire 250 connecting the low-voltage battery and the relay 430 according to an embodiment of the present disclosure.

The low-voltage wire 250 connecting the low-voltage battery with the relay 430 may be arranged inside of the battery for connection. For vans, the side members 710, which are vehicle structures, and a side seal 700 may be disconnected, but reinforcement of the vehicle body is difficult to perform due to the nature of the vans, resulting in a weak structure to side collision. A reinforcing material may be reflected to improve a weak structure of the van, but a vehicle body structure may be invaded by up to a collision invasion amount A in the case of side collision of the vehicle. Thus, the low-voltage power connector 200 may be arranged in the rear, and the low-voltage wire 250 connecting the low-voltage battery with the relay 430 may be provided inside the battery, thereby securing safety in the side collision situation of the vehicle.

Moreover, the front controller 400 of the high-voltage battery may be pushed into the vehicle in the case of front collision of the vehicle, such that the high-voltage power connector 500 may cause shock on the vehicle battery, and shock may also be generated in the high-voltage power connector 500, causing internal short-circuit. Thus, to prevent short-circuit between connectors, the high-voltage power connector 500 may be arranged on a side surface of the high-voltage battery. Moreover, a communication line connected to the controller 400 has no safety problem such as short-circuit, ignition, and explosion, even when the communication line is shocked in the front collision situation of the vehicle, but the controller 400 may be positioned in the front of the battery, such that the communication line may be arranged in the front of the low-voltage power connector 200 at a point separated from the high-voltage power connector 500 based on a wiring layout. Likewise, the high-voltage power connector 500 and the low-voltage power connector 200 may be arranged in the front-rear direction of the vehicle, so as to be respectively provided in positions adjacent to the high-voltage battery and the low-voltage battery in the front surface portion or the rear surface portion of the housing 300. The inner space of the housing 300 may be narrow, such that a wire connected to the controller 400 may be connected to the outside.

FIG. 3 illustrates arrangement of the housing 300, the hydrogen tank 100, and the side surface protection portion 720 formed in the side members 710 of the vehicle, according to an embodiment of the present disclosure.

The hydrogen tank 100 may be arranged in the rear portion of the vehicle, provided between the both side members 710 of the vehicle body, and provided in the rear portion of the housing 300. Hydrogen may be adjusted to a pressure suitable for use in a hydrogen charging station and may be received in the hydrogen tank 100. In one embodiment, the hydrogen tank 100 may be arranged in the center of the rear portion of the vehicle, thus being protected from front and side collision of the vehicle. When the hydrogen tank 100 is arranged in the rear portion of the vehicle, a space where the housing 300 is to be arranged may be insufficient in the rear portion of the vehicle. Thus, the housing 300 may be arranged in the front portion of the hydrogen tank 100, and the low-voltage power connector 200 may be provided between the hydrogen tank 100 and the housing 300 to prevent short-circuit from occurring due to side or front collision.

Moreover, the side surface protection portion 720 made of a shockproof material may be formed between the both side members 710 of the vehicle body, thereby protecting the housing 300. Referring to FIG. 3, the side surface protection portion 720 may be attached to the side members 710, and the exterior of the side members 710 may form the vehicle body with the side seal 700. The side surface protection portion 720 may delay a collision time in which collision directly occurs, thus delaying shock on the housing 300 provided with the battery and the relay 430, in the side collision situation of the vehicle. In addition, in the case of side collision of the vehicle, the vehicle body structure may be invaded by up to the collision invasion amount A, such that the low-voltage power connector 200 may be arranged in the rear and the low-voltage wire 250 connecting the low-voltage battery with the relay 430 may be configured inside the battery, thus reducing shock on the battery.

With a battery system of a vehicle according to the present disclosure, a hydrogen tank of a fuel cell vehicle, a high-voltage power connector based on arrangement of a high-voltage battery, a communication connector, and a low-voltage power connector may be arranged to avoid damage to the high-voltage battery and to prevent short-circuit, thereby reducing a safety risk such as fire, explosion, etc.

While the present disclosure has been shown and described in relation to specific embodiments thereof, it would be obvious to those of ordinary skill in the art that the present disclosure can be variously improved and changed without departing from the spirit of the present disclosure.

DESCRIPTION OF REFERENCE NUMERALS

100: Hydrogen Tank
200: Low-Voltage Power Connector
250: Low-Voltage Wire
270: Low-Voltage Line
300: Housing
400: Controller
410: BMS
420: Module Duct
430: Relay
440: Blower
500: High-Voltage Power Connector
600: Communication Connector
700: Side Seal
710: Side Member
720: Side Protection Portion
A: Collision Invasion Amount
B: Low-Voltage Connector Space
C: Fixing Hole

What is claimed is:

1. A battery system of a vehicle, comprising:

a housing provided between side members of a vehicle body, arranged in a front portion of the vehicle, wherein the housing comprises a top surface, a bottom surface, and side surfaces, which are configured to form an inner space of the housing;

a battery and a relay provided in the inner space of the housing;

a power connector and a communication connector that are electrically connected to the battery and the relay respectively and are provided in a front surface portion or a rear surface portion of the side surfaces of the housing respectively; and a hydrogen tank arranged in the rear portion of the vehicle and provided between the side members of the vehicle body, wherein the hydrogen tank is provided in the rear portion of the housing, wherein the power connector comprises a first power connector and a second power connector, and the first power connector and the communication connector are arranged at the same surface of the housing and spaced apart from each other, wherein the second power connector is disposed to face the communication connector on an other surface of the housing, and wherein the second power connector is provided between the hydrogen tank and the housing.

2. The battery system of claim 1, wherein the battery comprises a first battery and a second battery, and the first battery is arranged in a front of the second battery in the inner space of the housing.

3. The battery system of claim 1, wherein a voltage line is provided along an outer circumference of the housing, and the voltage line is connected to a controller through the second power connector.

4. The battery system of claim 1, wherein the first power connector and the second power connector are arranged in a front-rear direction of the vehicle so as to be respectively provided in positions adjacent to a first battery and a second battery in the front surface portion or the rear surface portion of the housing.

5. The battery system of claim 1, further comprising a controller provided adjacent to the housing outside the front surface portion or the rear surface portion of the housing, wherein the power connector and the communication connector are provided at separated points to avoid overlapping the controller in the front surface portion and the rear surface portion of the housing.

6. The battery system of claim 5, wherein the controller is provided in a center of the front surface portion of the housing, and the communication connector is provided in a point adjacent to the controller in the front surface portion of the housing.

7. The battery system of claim 2, further comprising: a wire connecting the second battery with the relay, wherein the wire is arranged inside of the battery for connection.

8. The battery system of claim 1, wherein the battery is a lithium-ion battery.

9. The battery system of claim 1, wherein a side surface protection portion made of a shockproof material is formed on both side members of the vehicle body.

10. The battery system of claim 1, wherein a fixing hole extending in an outward direction is formed on the top surface of the housing, and the housing is fixed to the vehicle body through the fixing hole.

* * * * *